United States Patent
Bhattacharya et al.

(10) Patent No.: US 12,551,528 B2
(45) Date of Patent: Feb. 17, 2026

(54) COMPOUNDS AND METHODS FOR TREATING OR REDUCING PRURITUS

(71) Applicant: ARIZONA BOARD OF REGENTS ON BEHALF OF THE UNIVERSITY OF ARIZONA, Tucson, AZ (US)

(72) Inventors: Martha Bhattacharya, Tucson, AZ (US); Tally Largent-Milnes, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 853 days.

(21) Appl. No.: 17/794,939

(22) PCT Filed: Jan. 25, 2021

(86) PCT No.: PCT/US2021/014876
§ 371 (c)(1),
(2) Date: Jul. 22, 2022

(87) PCT Pub. No.: WO2021/151059
PCT Pub. Date: Jul. 29, 2021

(65) Prior Publication Data
US 2023/0047844 A1 Feb. 16, 2023

Related U.S. Application Data

(60) Provisional application No. 62/965,556, filed on Jan. 24, 2020.

(51) Int. Cl.
*A61P 17/04* (2006.01)
*A61K 9/127* (2006.01)
*A61K 31/7105* (2006.01)
*A61K 38/17* (2006.01)

(52) U.S. Cl.
CPC ............ *A61K 38/177* (2013.01); *A61K 9/127* (2013.01); *A61K 31/7105* (2013.01); *A61P 17/04* (2018.01)

(58) Field of Classification Search
CPC ...................................... A61P 17/04
See application file for complete search history.

(56) References Cited

U.S. PATENT DOCUMENTS

2018/0305689 A1* 10/2018 Sætrom et al. ...... C12N 15/113

OTHER PUBLICATIONS

Bhattacharya et al. (2016) "TMEM 184b promotes axon degeneration and neuromuscular junction maintenance" Journal of Neuroscience, 36(17), 4681-4689. (Year: 2016).*
Larsen et al. (Jan. 26, 2020) "TMEM184B controls pruriceptor specification and function" bioRxiv preprint, version 1, 32 pages. (Year: 2020).*
Larsen et al. (2022) "Transmembrane protein TMEM184B is necessary for interleukin-31-induced itch" Pain, 163(5), e642-e653. (Year: 2022).*

* cited by examiner

*Primary Examiner* — James Joseph Graber
(74) *Attorney, Agent, or Firm* — NGUYEN TARBET IP LAW

(57) ABSTRACT

The present invention features methods and compositions for preventing, inhibiting, or reducing the sensation of itch (pruritus) by modulating the gene expression of TMEM184B. Modulating the gene expression of TMEM184B may comprise increasing Tmem184B protein expression, increasing Tmem184B protein activity or both. Furthermore, the methods and compositions described herein may activate the Tmem184B protein or activate a pathway leading to Tmem184B activation. Additionally, the methods and compositions for modulating the gene expression of TMEM184B may be used to help prevent or treat certain diseases or conditions such as dermatitis.

Figure 1A:
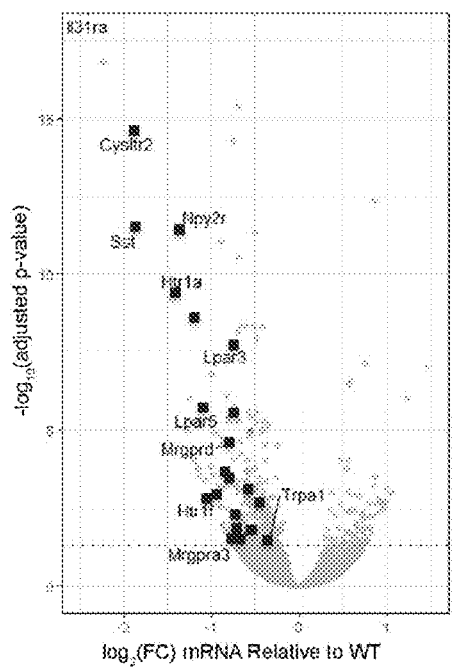

8 Claims, 6 Drawing Sheets
(4 of 6 Drawing Sheet(s) Filed in Color)

FIG. 1C
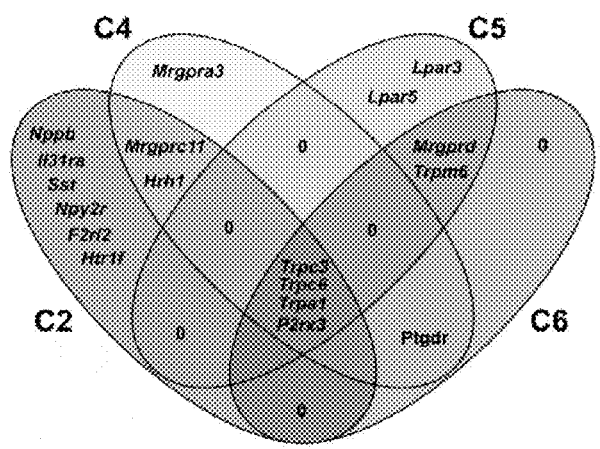
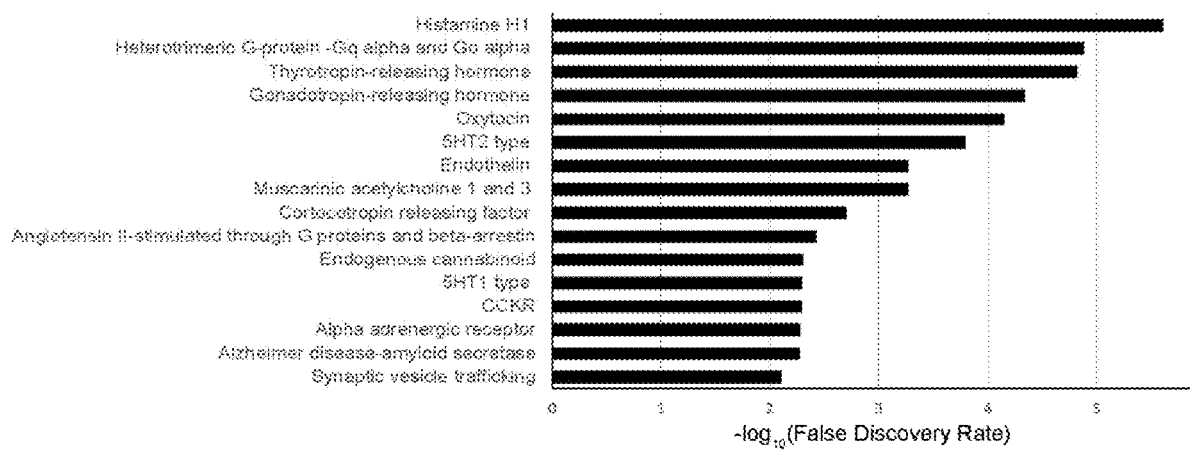
FIG. 1D

Il-31

Chloroquine

Hot Plate von Frey

Tail Flick

Capsaicin

AITC

B-alanine

CYM5442

LY344862

IL-31

Chloroquine

AAV9-hSyn-Tmem184b-T2A-mCherry
or AAV9-hSyn-mCherry

Wild Type

Mutant

COMPOUNDS AND METHODS FOR TREATING OR REDUCING PRURITUS

CROSS-REFERENCES TO RELATED APPLICATIONS

This application is a 371 Application of PCT/US21/14876 filed Jan. 25, 2021, which claims benefit of U.S. Provisional Application No. 62/965,556 filed Jan. 24, 2020, the specification(s) of which is/are incorporated herein in their entirety by reference.

STATEMENT REGARDING FEDERALLY SPONSORED RESEARCH OR DEVELOPMENT

This invention was made with government support under Grant No. R01 NS105680, awarded by National Institutes of Health. The government has certain rights in the invention.

BACKGROUND OF THE INVENTION

Field of the Invention

The present invention relates to methods and compounds for treating or ameliorating pruritus, the sensation of itch, including conditions such as dermatitis.

Background Art

Somatosensory neurons transduce multiple types of stimuli, including temperature, chemical, and physical changes in the local environment of their nerve endings. Nerve endings receiving these cues can also directly sense inflammatory compounds, and this inflammation alters their response properties to cause hyperalgesia (heightened responses to noxious stimuli) and allodynia (painful responses to non-noxious stimuli). A common consequence of increased skin inflammation is the triggering of itch.

Acute and chronic itch are significant morbidities in humans. Itch-causing pathological conditions have a variety of causes, including skin disorders (atopic dermatitis), drug-induced reactions, systemic disorders such as liver disease, and other neurological disorders. The sensation of itch is distinct from pain and is carried by a subset of itch-specific somatosensory neurons called pruriceptive neurons with cell bodies in the dorsal root ganglia (DRG). Skin itch is triggered by release of pro-inflammatory compounds such as cytokines (interleukins IL-4, IL-13, and IL-31), thymic stromal lymphopoietin (TSLP), and histamine from mast cells and epithelial cells, which act upon membrane receptors and channels present in epidermal nerve endings. In addition to chemical itch, mechanical stimuli can evoke similar itch sensations but rely on a distinct spinal circuit.

Somatosensory neurons have been classically categorized using soma size, electrical properties (including myelination state), and expression of a few markers that include lectins (IB4), neuroactive peptides, and ion channels. Recently, multiple groups have described the diversity of somatosensory neurons from the adult DRG using single-cell RNA sequencing, a powerful approach that has allowed an improved classification of subtypes of sensory neurons and their abilities to respond to agonists. These studies have classified DRG neurons into six to eight defined groups based solely on expression of unique transduction or signaling molecules. In addition, by genetically labeling and sorting DRG populations prior to RNAseq, the ion channels conferring unique electrical properties have been mapped to eight distinct populations.

One population of DRG neurons identified in these single cell RNAseq studies is uniquely identified by expression of the peptides Nppb (natriuretic peptide B, also called brain natriuretic peptide, or BNP) and Somatostatin (Sst), as well as IL-31 receptor type a (Il31ra). These cells, representing 6-8% of all neurons in the DRG, are purely pruriceptive, transmitting itch, but not pain, signals to the dorsal horn of the spinal cord. These neurons develop from an initially Runx1$^+$, TrkA$^+$ population that ultimately loses TrkA expression but gains peptidergic markers such as Calcitonin gene related peptide (CGRP).

BRIEF SUMMARY OF THE INVENTION

It was surprisingly found that overexpression of TMEM184B caused a reduction in scratching in response to interleukin-31 (Il-31) exposure. This was surprising given previous studies had shown that knock-out of TMEM184B resulted in a reduction in Il-31 induced scratching.

TMEM184B is a relatively uncharacterized 7-pass transmembrane protein that is a member of the Transporter-Opsin-GPCR (TOG) superfamily of proteins. Tmem184b is required for efficient axon degeneration following nerve injury, and also for proper sensory and motor nerve terminal maintenance. In mice lacking Tmem184b, nociceptive terminals in the epidermis show swollen endings, and mice show deficits in broad measures of sensorimotor behavior. Inventors surprisingly found that Tmem184b controls the expression of a large cohort of sensory receptors in the DRG, specifically those in the NP3/C2 population mediating pruriception. Specific behavioral changes in acute itch but not pain were found when Tmem184b was modulated, showing that Tmem184b activity influences proper pruriception. The data herein identify a critical role for Tmem184b in itch.

In some embodiments, the present invention features methods and compounds for preventing, inhibiting, or reducing pruritus (e.g., the sensation of itch). The method comprises increasing activity or abundance of TMEM184B. In certain embodiments, the increase in activity or abundance of TMEM184B reduces IL-31-inducible pruritus, however the present invention is not limited to IL-31-inducible pruritus. The method may be used to help prevent or treat certain diseases or conditions such as dermatitis.

One of the unique and inventive technical features of the present invention is the modulation TMEM184B gene expression. Without wishing to limit the invention to any theory or mechanism, it is believed that the technical feature of the present invention advantageously provides for a method for treating pruritus or dermatitis. None of the presently known prior references or work has the unique inventive technical feature of the present invention.

The present invention features a method treating sensation of itch (pruritus) in a subject in need thereof. In some embodiments, the method comprises modulating TMEM184B gene expression in the subject to cause a reduction in the sensation of itch (pruritus) In some embodiments, modulating TMEM184B gene expression comprises increasing expression of TMEM184B or increasing the activity of Tmem184b protein.

The present invention may also feature a method of treating dermatitis in a subject in need thereof. In some embodiments, the method comprises modulating TMEM184B gene expression in the subject to cause a reduction in dermatitis. In other embodiments, modulating TMEM1844B gene expression comprises increasing expression of TMEM184B or increasing activity of Tmem184b protein.

The present invention may further feature a composition for modulating TMEM184B gene expression. In some embodiments, the composition comprises an active compound in a liposome carrier. In other embodiments, the active compound modulated TMEM1844B gene expression by increasing expression of TMEM184B or increasing activity of Tmem184b protein.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

Figure 1B:
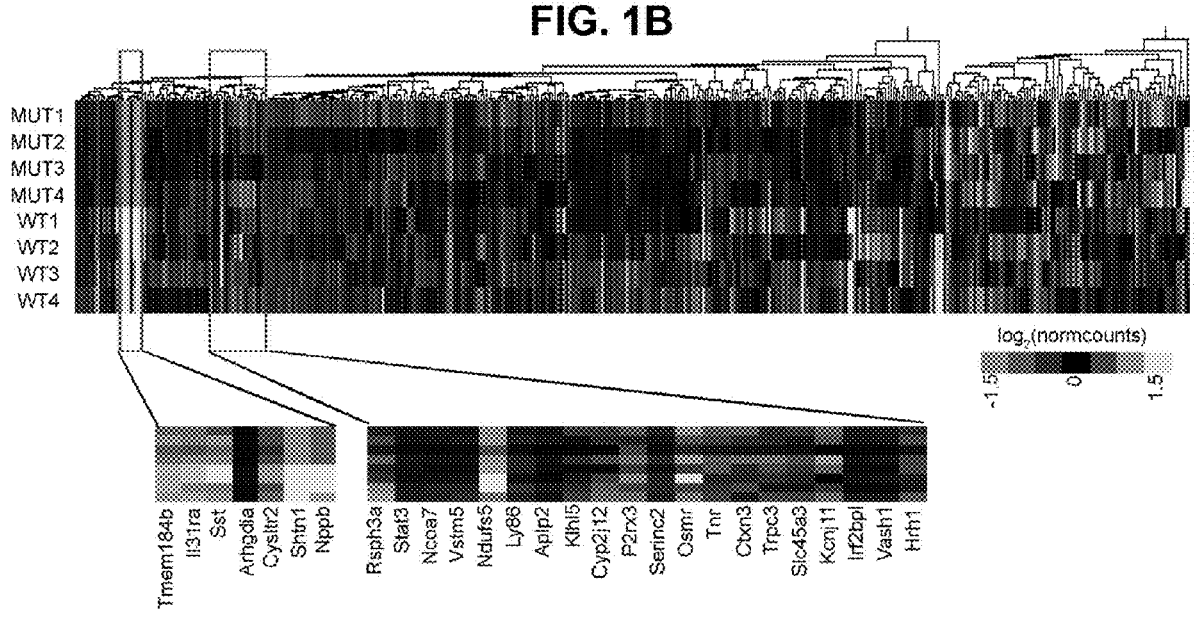

The patent or application file contains at least one drawing executed in color. Copies of this patent or patent application publication with color drawing(s) will be provided by the Office upon request and payment of the necessary fee. The features and advantages of the present invention will become apparent from a consideration of the following detailed description presented in connection with the accompanying drawings in which:

FIGS. 1A-1D show Tmem184b controls the expression of pruriceptor markers. FIG. 1A shows a volcano plot of RNA-sequencing data. Dots above the dashed line are significantly differentially expressed genes (FDR ≤0.05 (dashed line); Squares indicate itch-related genes; Dots below the dashed line are non-differentially expressed genes. FIG. 1B shows a heatmap showing aligned, variance-normalized samples (n=4 per genotype), and differentially expressed genes identified using DESeq2 (FDR ≤0.05, n=405 genes) independently clustered by expression similarity. At right, the top section of the heatmap is expanded to show individual genes that are most strongly downregulated by loss of Tmem184b. FIG. 1C shows a venn diagram of a subset of downregulated genes showing their specific expression in subsets of nociceptors. FIG. 1D shows an enriched panther pathway (FDR <0.05) in downregulated genes.

Figure 2A:
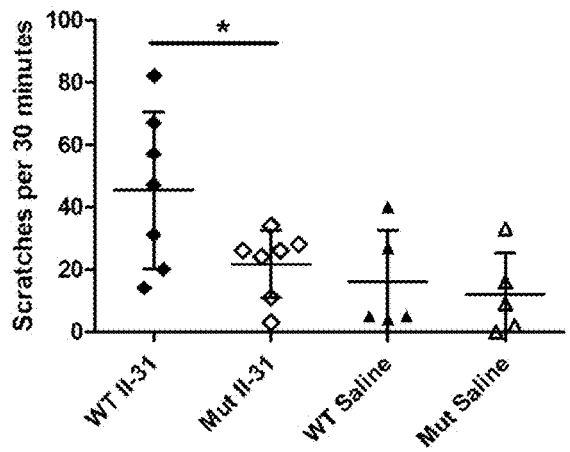
Figure 2B:
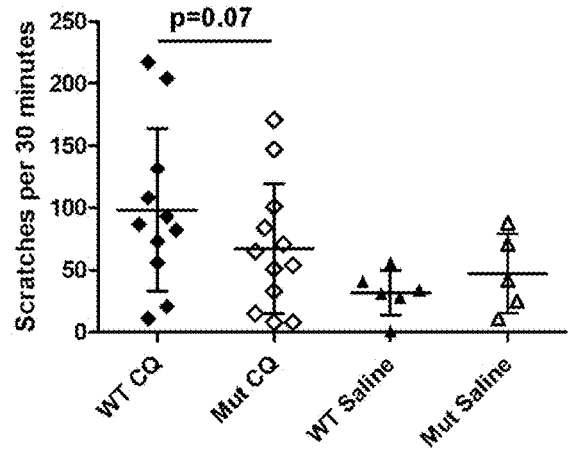
Figure 2C:
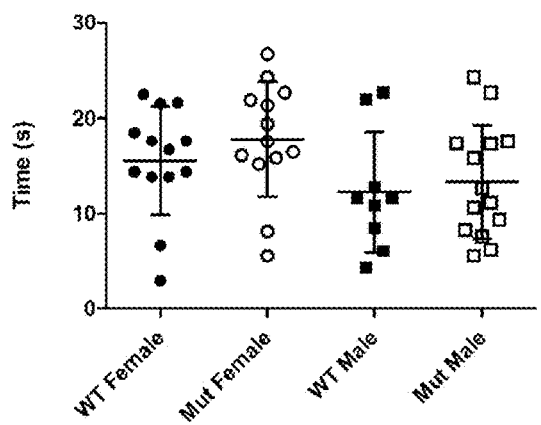
Figure 2D:
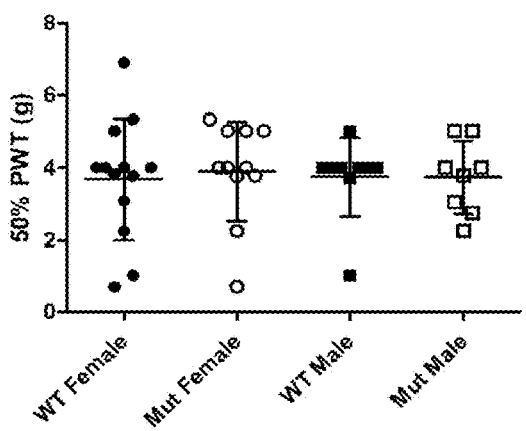
Figure 2E:
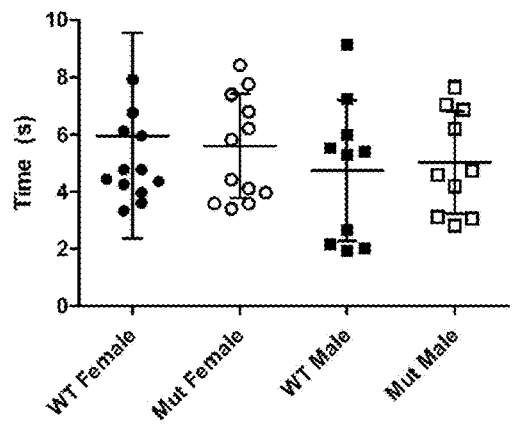

FIGS. 2A-2E show Tmem184b is required for itch but not pain responses. FIG. 2A shows Tmem184b mutant mice show reduced scratching to IL-31 injection. P=0.018 between WT and Mut IL-31 injected, unpaired t-test; n.s., not significant (p>0.05). N for each (L to R)=7, 7, 5, 5. FIG. 2B shows chloroquine-induced scratching responses. FIG. 2C shows hot plate analysis. FIG. 2D shows tail flick analysis. FIG. 2E shows baseline mechanical thresholds.

Figure 3A:
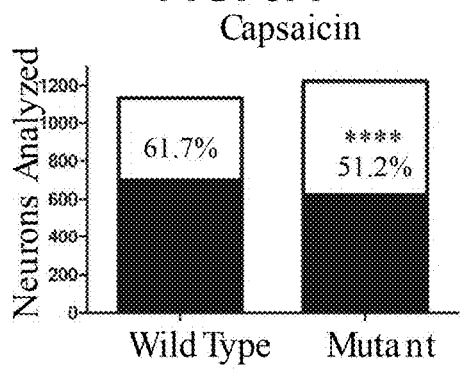
Figure 3B:
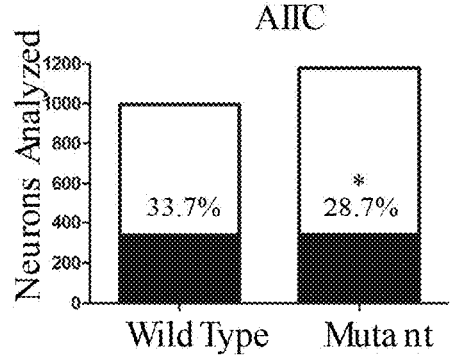
Figure 3C:
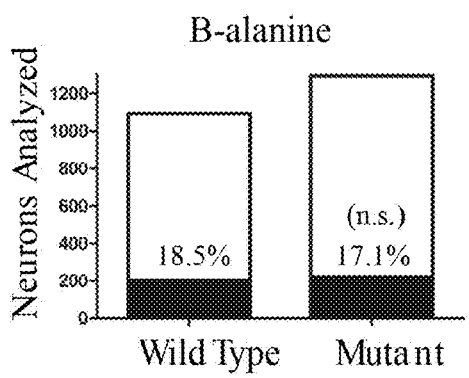
Figure 3D:
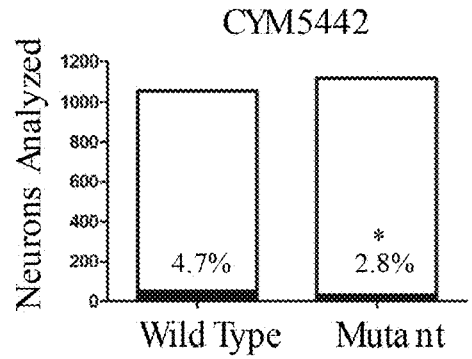
Figure 3E:
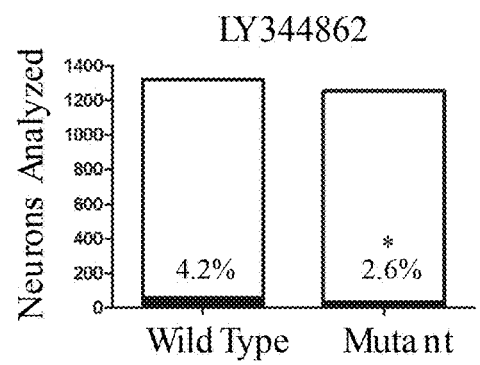
Figure 3F:
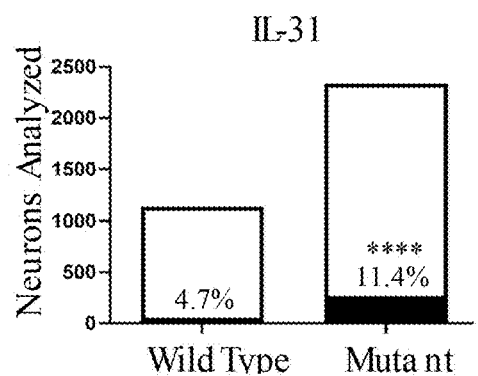
Figure 3G:
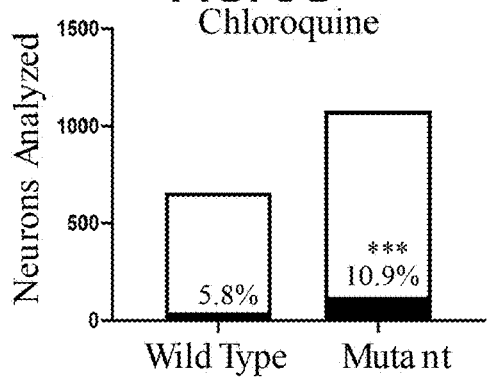
Figure 3H:
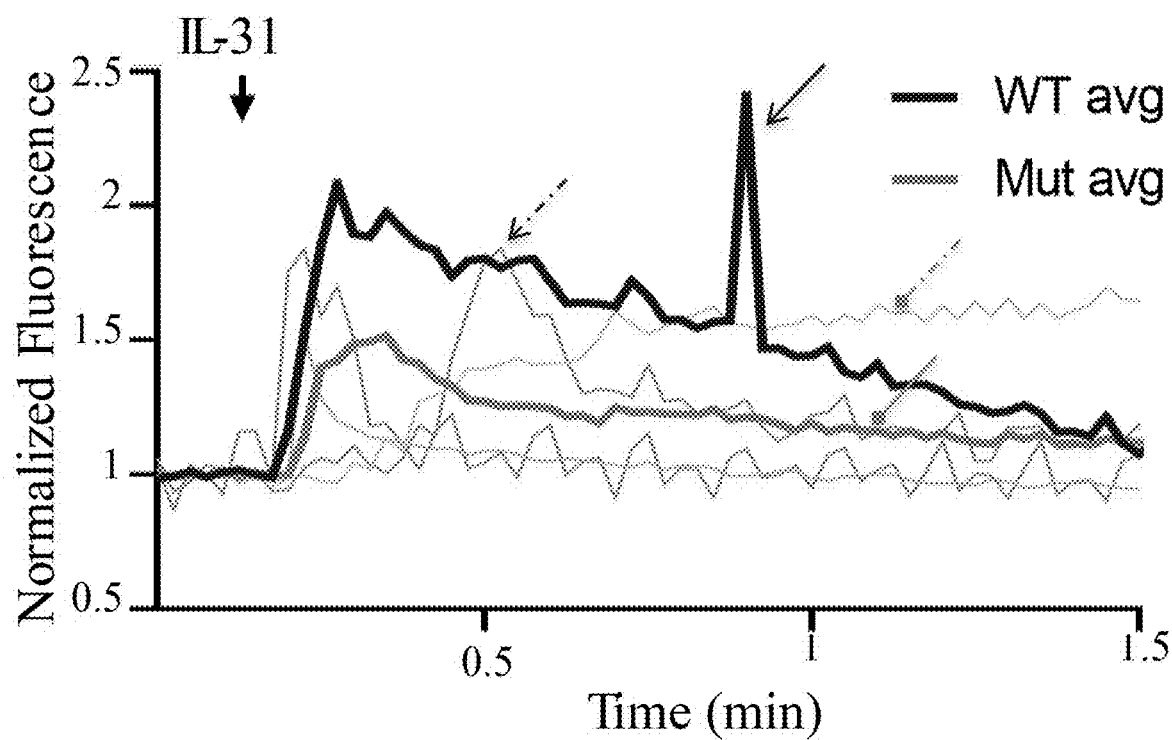

FIGS. 3A-3H show aberrant cellular responses to nociceptive and pruriceptive agonists in Tmem184b mutant mice. Total analyzed neurons and percent responders are shown for capsaicin, a Trpv1 agonist (1 µM) (FIG. 3A), AITC, a Trpa1 agonist (200 µM) (FIG. 3B), B-alanine (5 mM), an MrgprD agonist (FIG. 3C), CYM5442, a S1pr1 agonist (250 µM) (FIG. 3D), LY344862, an Htr1f agonist (2.5 µM) (FIG. 3E), IL-31 (1 µM) (FIG. 3F), and chloroquine (CQ, 200 µM), an MrgprA3 agonist (FIG. 3G). Chi-square analysis was used to evaluate statistical significance. FIG. 3H shows an average IL-31 response calculated from wild type (indicated by arrows) and mutant neurons I classified as IL-31 responders. N=28 wild type and 37 mutant neurons cultured and imaged on the same day with the same solutions were averaged. Three representative individual neurons from each genotype contributing to the average trace are shown (dashed arrow, wild type; dashed arrow with diamond head, mutant).

Figure 4A:
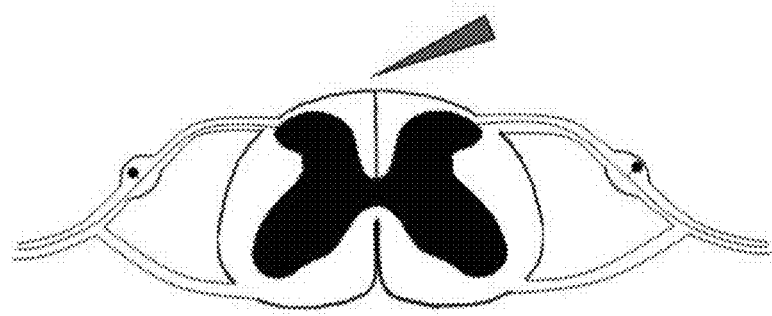
Figure 4B:
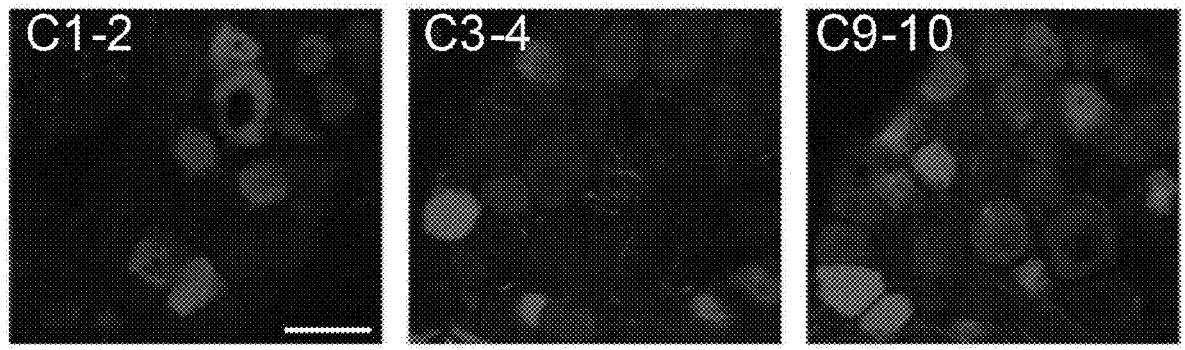
Figure 4C:
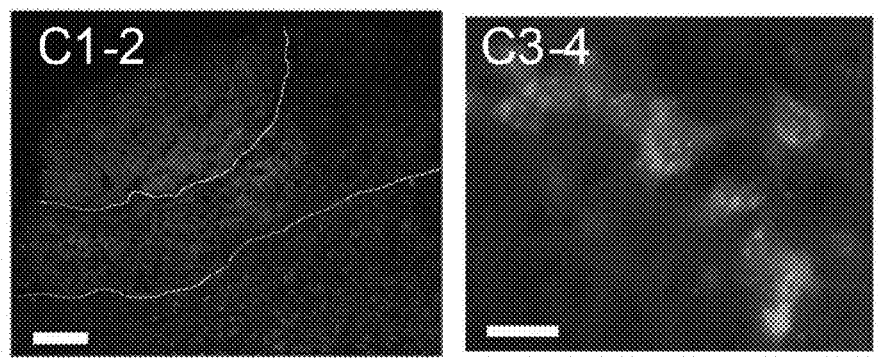
Figure 4D:
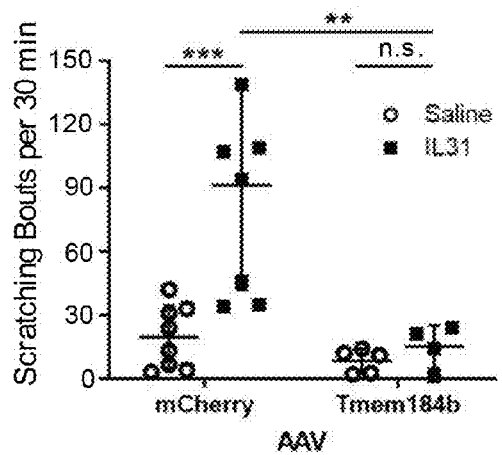
Figure 4E:
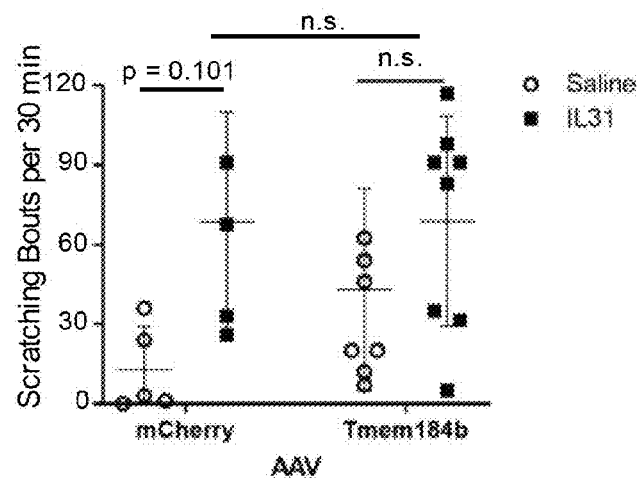

FIGS. 4A-4E show re-expression of Tmem184b in adult mutant ganglia in vivo does not increase IL-31 responses, but over-expression of Tmem184b in wild type mice suppresses IL-31 induced pruritus. FIG. 4A shows a schematic of the adult rescue experiment. FIG. 4B shows DRGs from cervical regions of AAV-injected mice, showing successful virus infection and spread between C1-C10 (mCherry). FIG. 4C shows spinal cord expression of mCherry in both incoming DRG processes (left) and in grey matter (right). FIG. 4D shows wild type scratch responses, sorted by AAV type and agonist (IL-31 or saline). FIG. 4E shows Tmem184b mutant scratch responses, sorted by AAV type and agonist. Numbers within the bars indicate mice per group. Statistical evaluation was performed using two-way ANOVA.

TERMS

Unless otherwise explained, all technical and scientific terms used herein have the same meaning as commonly understood by one of ordinary skill in the art to which a disclosed invention belongs. The singular terms "a," "an," and "the" include plural referents unless context clearly indicates otherwise. Similarly, the word "or" is intended to include "and" unless the context clearly indicates otherwise. The term "comprising" means that other elements can also be present in addition to the defined elements presented. The use of "comprising" indicates inclusion rather than limitation. Stated another way, the term "comprising" means "including principally, but not necessary solely". Furthermore, variation of the word "comprising", such as "comprise" and "comprises", have correspondingly the same meanings. In one respect, the technology described herein related to the herein described compositions, methods, and respective component(s) thereof, as essential to the invention, yet open to the inclusion of unspecified elements, essential or not ("comprising").

All embodiments disclosed herein can be combined with other embodiments unless the context clearly dictates otherwise.

Suitable methods and materials for the practice and/or testing of embodiments of the disclosure are described below. Such methods and materials are illustrative only and are not intended to be limiting. Other methods and materials similar or equivalent to those described herein can be used. For example, conventional methods well known in the art to which the disclosure pertains are described in various general and more specific references, including, for example, Sambrook et al., *Molecular Cloning: A Laboratory Manual*, 2d ed., Cold Spring Harbor Laboratory Press, 1989; Sambrook et al., *Molecular Cloning: A Laboratory Manual*, 3d ed., Cold Spring Harbor Press, 2001; Ausubel et al., *Current Protocols in Molecular Biology*, Greene Publishing Associates, 1992 (and Supplements to 2000); Ausubel et al., *Short Protocols in Molecular Biology: A Compendium of Methods from Current Protocols in Molecular Biology*, 4th ed., Wiley & Sons, 1999; Harlow and Lane, *Antibodies: A Laboratory Manual*, Cold Spring Harbor Laboratory Press, 1990; and Harlow and Lane, *Using Antibodies: A Laboratory Manual*, Cold Spring Harbor Laboratory Press, 1999, *Gene Expression Technology* (Methods in Enzymology, Vol. 185, edited by D. Goeddel, 1991. Academic Press, San Diego, Calif.), "Guide to Protein Purification" in *Methods in Enzymology* (M. P. Deutshcer, ed., (1990) Academic Press, Inc.); *PCR Protocols: A Guide to Methods and Applications* (Innis, et al. 1990. Academic Press, San Diego, Calif.), *Culture of Animal Cells: A Manual of Basic Technique*, $2^{nd}$ Ed. (R. I. Freshney. 1987. Liss, Inc. New York, N.Y.), *Gene Transfer and Expression Protocols*, pp. 109-128, ed. E. J. Murray, The Humana Press Inc., Clifton, N.J.), and the Ambion 1998 Catalog (Ambion, Austin, Tex.), the disclosures of which are incorporated in their entirety herein by reference.

All publications, patent applications, patents, and other references mentioned herein are incorporated by reference in their entirety for all purposes. In case of conflict, the present specification, including explanations of terms, will control.

Although methods and materials similar or equivalent to those described herein can be used to practice or test the disclosed technology, suitable methods and materials are described below. The materials, methods, and examples are illustrative only and not intended to be limiting.

In order to facilitate review of the various embodiments of the disclosure, the following explanations of specific terms are provided:

As used herein, the terms "pruritus" and "itch" refer to the sensation of itch and may be used interchangeably. Pruritus or itch may provoke the urge to scratch.

As used herein, the term "disease" or "disorder" or "condition" may refer to any alteration in state of the body or of some of the organs, interrupting or disturbing the performance of their functions and/or causing symptoms such as discomfort, dysfunction, distress, or even death to the person afflicted or those in contact with a person. A disease or disorder or condition can also relate to a distemper, ailing, ailment, malady, disorder, sickness, illness, complaint, indisposition or affliction.

As used herein, the terms "treat" or "treatment" or "treating" refers to both therapeutic treatment and prophylactic or preventative measures, wherein the object is to prevent or slow the development of the disease, such as slow down the development of a disorder, or reducing at least one adverse effect or symptom of a condition, disease or disorder, e.g., any disorder characterized by insufficient or undesired organ or tissue function. Treatment is generally "effective" if one or more symptoms or clinical markers are reduced as that term is defined herein. Alternatively, a treatment is "effective" if the progression of a disease is reduced or halted. That is, "treatment" includes not just the improvement of symptoms or decrease of markers of the disease, but also a cessation or slowing of progress or worsening of a symptom that would be expected in absence of treatment. Beneficial or desired clinical results include, but are not limited to, alleviation of one or more symptom(s), diminishment of extent of disease, stabilized (e.g., not worsening) state of disease, delay or slowing of disease progression, amelioration or palliation of the disease state, and remission (whether partial or total), whether detectable or undetectable. "Treatment" can also mean prolonging survival as compared to expected survival if not receiving treatment.

As used herein, "administering" and the like refer to the act physically delivering a composition or other therapy (e.g. an immunotherapy) described herein into a subject by such routes as oral, mucosal, topical, transdermal, suppository, intravenous, parenteral, intraperitoneal, intramuscular, intralesional, intrathecal, intranasal or subcutaneous administration. Parenteral administration includes intravenous, intramuscular, intra-arterial, intradermal, subcutaneous, intraperitoneal, intraventricular, and intracranial administration. When a disease, disorder or condition, or a symptom thereof, is being treated, administration of the substance typically occurs after the onset of disease, disorder or condition or symptoms thereof. When a disease, disorder or condition, or symptoms thereof, are being prevented, administration of the substance typically occurs before the onset of the disease, disorder or condition or symptoms thereof.

A composition can also be administered by topical intranasal administration (intranasally) or administration by inhalant. As used herein, "topical intranasal administration" means delivery of the compositions into the nose and nasal passages through one or both of the nares and can comprise delivery by a spraying mechanism (device) or droplet mechanism (device), or through aerosolization of the composition. Administration of the compositions by inhalant can be through the nose or mouth via delivery by a spraying or droplet mechanism. As used herein, "an inhaler" can be a spraying device or a droplet device for delivering a composition, in a pharmaceutically acceptable carrier, to the nasal passages and the upper and/or lower respiratory tracts of a subject. Delivery can also be directly to any area of the respiratory system (e.g., lungs) via intratracheal intubation. The exact amount of the compositions required will vary from subject to subject, depending on the species, age, weight and general condition of the subject, the severity of the disorder being treated, the particular composition used, its mode of administration and the like. Thus, it is not possible to specify an exact amount for every composition. However, an appropriate amount can be determined by one of ordinary skill in the art using only routine experimentation given the teachings herein.

Pharmaceutical compositions for oral administration include, but are not limited to, powders or granules, suspensions or solutions in water or non-aqueous media, capsules, sachets, or tablets. Thickeners, flavorings, diluents, emulsifiers, dispersing aids or binders may be desirable. The composition for modulating TMEM184B gene expression can be administered to a subject orally in a dosage taken once daily or in divided doses. A person of skill, monitoring a subject's clinical response, can adjust the frequency of administration of the medication according to methods known in the art.

Pharmaceutical formulations for topical administration may include ointments, lotions, creams, gels, drops, suppositories, sprays, liquids and powders. Conventional pharmaceutical carriers, aqueous, powder or oily bases, thickeners and the like may be necessary or desirable The pharmaceutical formulation can be administered in a number of ways depending on whether local or systemic treatment is desired, and on the area to be treated. A preferred mode of administration of the composition is orally. Other modes of administration may be topically (including ophthahnically, vaginally, rectally, intranasally), by inhalation, or parenterally, for example by intravenous drip, subcutaneous, intraperitoneal or intramuscular injection. The disclosed compounds can be administered orally, intravenously, intraperitoneally, intramuscularly, subcutaneously, intracavity, or transdermally.

As used herein, the term "pharmaceutically acceptable carrier" or "pharmaceutically acceptable vehicle" refers to any appropriate or useful carrier or vehicle for introducing a composition to a subject. Pharmaceutically acceptable carriers or vehicles may be conventional but are not limited to conventional vehicles. For example, E. W. Martin, *Remington's Pharmaceutical Sciences*, Mack Publishing Co., Easton, Pa., 15th Edition (1975) and D. B. Troy, ed. Remington: The Science and Practice of Pharmacy, Lippincott Williams & Wilkins, Baltimore Md. and Philadelphia, Pa., 21st Edition (2006) describe compositions and formulations suitable for pharmaceutical delivery of one or more therapeutic compounds or molecules.

Pharmaceutical carriers are known to those skilled in the art. These most typically would be standard carriers for administration of drugs to humans, including solutions such as sterile water, saline, and buffered solutions at physiological pH. Typically, an appropriate amount of a pharmaceutically acceptable salt is used in the formulation to render the formulation isotonic. Examples of the pharmaceutically acceptable carrier include, but are not limited to, saline, Ringer's solution and dextrose solution. The pH of the solution is preferably from about 5 to about 8, and more preferably from about 7 to about 7.5. Further carriers include sustained release preparations such as semi-permeable matrices of solid hydrophobic polymers containing the disclosed compounds, which matrices are in the form of shaped articles, e.g., films, liposomes, microparticles, or microcapsules. It will be apparent to those persons skilled in the art that certain carriers can be more preferable depending upon, for instance, the route of administration and concentration of composition being administered. Other compounds can be administered according to standard procedures used by those skilled in the art.

Pharmaceutical formulations can include additional carriers, as well as thickeners, diluents, buffers, preservatives, surface active agents and the like in addition to the compounds disclosed herein. Pharmaceutical formulations can also include one or more additional active ingredients such as antimicrobial agents, anti-inflammatory agents, anesthetics, and the like.

As used herein, the terms "subject" and "patient" are used interchangeably. As used herein, a subject can be an animal (amphibian, reptile, avian, fish, or mammal) such as a non-primate (e.g., cows, pigs, horses, cats, dogs, rats, etc.) or a primate (e.g., monkey, ape and human). In specific embodiments, the subject is a human. In one embodiment, the subject is a mammal (e.g., a human, a dog) having a disease, disorder or condition described herein (i.e., pruritus or dermatitis). In another embodiment, the subject is a mammal (e.g., a human, a dog) at risk of developing a disease, disorder or condition described herein. In certain instances, the term patient refers to a human under medical care or animals under veterinary care.

DETAILED DESCRIPTION OF THE INVENTION

The present invention features methods and compounds for preventing, inhibiting, or reducing pruritus (the sensation of itch). The method comprises increasing activity or abundance of TMEM184B. The methods may be applied in vitro or in vivo, e.g., in a subject such as a mammal. In certain embodiments, the increase in activity or abundance of TMEM184B reduces IL-31-inducible pruritus.

The present invention features a method treating sensation of itch (pruritus) in a subject in need thereof. In some embodiments, the method comprises modulating TMEM184B gene expression in the subject to cause a reduction in the sensation of itch (pruritus) In some embodiments, modulating TMEM184B gene expression comprises increasing expression of TMEM184B or increasing the activity of Tmem184B protein.

The present invention may also feature a method of treating dermatitis in a subject in need thereof. In some embodiments, the method comprises modulating TMEM184B gene expression in the subject to cause a reduction in dermatitis. In other embodiments, modulating TMEM1844B gene expression comprises increasing expression of TMEM184B or increasing activity of Tmem184B protein.

In some embodiments, modulating TMEM184B gene expression causes an increase in TMEM184B expression causing an increase in Tmem184B protein expression, an increase in Tmem184B protein activity or both.

In some embodiments, the TMEM184B gene expression is modulated by administering a compound. In some embodiments, TMEM184B gene expression is modulated by administering a compound to the subject.

In some embodiments, the compound may cause an increase in TMEM184B expression causing an increase in Tmem184B protein expression, an increase in Tmem184B protein activity or both.

In some embodiments, the compound may activate the Tmem184B protein or activate a pathway leading to Tmem184B activation.

In other embodiments, the compound increases the expression of TMEM184B. In some embodiments, the compound increases the expression of the Tmem184b protein. In other embodiments, the compound that increases expression of TMEM184B is recombinant TMEM184B.

In some embodiments, the recombinant TMEM184B is integrated into a pharmaceutically acceptable carrier. In other embodiments, the pharmaceutically acceptable carrier is a lipid-based carrier. In further embodiments, the lipid-based carrier is a liposome.

In some embodiments, the TMEM184B gene expression is modulated by administering a compound. In some embodiments, TMEM184B gene expression is modulated by administering a compound to the subject. In some embodiments, the compound increases activity of Tmem184b protein. In other embodiments, the compound that increases activity of Tmem184b protein is a molecule that inhibits an inhibitor of TMEM184B. In further embodiments, the molecule that inhibits an inhibitor of TMEM184B is an antisense RNA.

In some embodiments, the sensation of itch (pruritus) is IL-31-induced itch. In other embodiments, the method described herein further treats dermatitis. In other embodiments, the methods described herein may be used to prevent or treat inflammation, irritation, or itch. In some embodiments, the methods described herein are not limited to the prevention or treatment of the aforementioned diseases or conditions.

The present invention may further feature a composition for modulating TMEM184B gene expression. In some embodiments, the composition comprises an active compound in a liposome carrier. In other embodiments, the active compound modulated TMEM1844B gene expression by increasing expression of TMEM184B or increasing activity of Tmem184B protein.

In some embodiments, the composition may cause an increase in TMEM184B expression causing an increase in Tmem184B protein expression, an increase in Tmem184B protein activity or both.

In some embodiments, the composition may activate the Tmem184B protein or activate a pathway leading to Tmem184B activation.

In some embodiments, the active compound comprises recombinant TMEM184B, a molecule that inhibits an inhibitor of TMEM184B, or an antisense RNA.

In some embodiments, the composition is used to treat pruritus or dermatitis. In other embodiments, the composition is used to prevent or treat inflammation, irritation, or itch. In some embodiments, the compositions described herein are not limited to the prevention or treatment of the aforementioned diseases or conditions.

In some embodiments, the composition is administered topically. In other embodiments, the composition is in the form of a lotion, cream, or gel. In some embodiments, the composition is administered orally. In other embodiments, the composition is in the form of a pill or aqueous solution. In further embodiments, the composition is administered via inhalation.

In some embodiments, the methods described herein may be used to help prevent or treat certain diseases or conditions such as dermatitis. In other embodiments, the methods described herein may be used to prevent or treat inflammation, irritation, or itch. The present invention is not limited to applications of dermatitis. In some embodiments, the present invention is not limited to the aforementioned diseases or conditions.

As an example, the method may comprise introducing to a subject a compound that activates TMEM184B or a compound that increases expression of TMEM184B, wherein an increase in activity or abundance of TMEM184B causes a reduction in itch (e.g., IL-31-induced itch).

A compound for increasing abundance or activity of TMEM184B may include, but is not limited to, a small molecule, such as a drug, an oligonucleotide (e.g., an interfering or antisense RNA or the like, e.g., a molecule for inhibiting an inhibitor of TMEM184B), etc. In certain embodiments, the compound is TMEM184B, wherein TMEM184B is administered using a pharmaceutically appropriate carrier. In certain embodiments, the carrier is a lipid-based system, e.g., liposomes, emulsions, etc. The present invention is not limited to the aforementioned carriers.

Methods for integrating a protein into a liposome for delivery are well known to one of ordinary skill in the art. Liposomes generally comprise a shell of amphiphilic lipid species, such as phospholipids, that encapsulate an aqueous solution. The lipids are arranged in a bilayer with the polar head groups of the two leaflets facing toward the inside and the outside aqueous phase and the hydrophobic tails of the phospholipids facing toward each other. Based on the number of membrane layers, vesicles are called unilamellar or multilamellar. For biotechnological applications, the use of unilamellar vesicles is typical, and these vesicle species can be defined according to their size, ranging from small unilamellar vesicles (SUVs having a diameter between 25 and 100 nm) to large unilamellar vesicles (LUVs with a diameter between 100 nm and 1 μm) and giant unilamellar vesicles (GUVs being larger than 1 μm up to 100 μm in diameter). Polymersomes consisting of amphiphilic block copolymers are of rising interest for delivery of molecules and proteins.

Methods for reconstituting transmembrane proteins into a liposome may include, for example, detergent-mediated reconstitution. For example, liposomes may be formed via extrusion or sonication, and after a presolubilization step, the solubilized proteins are subsequently added to the liposome preparation, which eventually leads to the incorporation of the proteins into the membranes. The present invention is not limited to detergent-mediated reconstitution and may include any appropriate mechanism for integrating a transmembrane protein into a liposome or other appropriate carrier, e.g., mechanical means, peptide-induced fusion, etc.

The present invention also features a method of preventing, inhibiting or reducing pruritus (the sensation of itch) in a subject in need thereof. The method may comprise administering a compound that activates TMEM184B or a compound that increases expression of TMEM184B to the subject in need, wherein an increase in activity or abundance of TMEM184B causes a reduction in pruritus, e.g., IL-31-induced pruritus.

In other embodiments, the method may further comprise introducing to a subject a compound that activates TMEM184B or a compound that increases expression of TMEM184B, wherein an increase in activity or abundance of TMEM184B causes a reduction in the sensation of itch. In certain embodiments, the sensation of itch is dependent on IL31ra, the receptor for IL-31. However, the present invention is not limited to IL31-dependent itch.

In other embodiments, the present invention also features a method of preventing, inhibiting or reducing pruritus (sensation of itch) in a subject in need thereof. The method may comprise introducing to the subject a compound that activates TMEM184B or a compound that increases expression of TMEM184B, wherein an increase in activity or abundance of TMEM184B causes a reduction in pruritus, e.g., IL-31-induced pruritus.

The present invention also features a method of treating dermatitis in a subject in need thereof, wherein the method comprises introducing to the subject a compound that activates TMEM184B, or a compound that increases expression of TMEM184B, wherein an increase in activity or abundance of TMEM184B causes a reduction in dermatitis.

EXAMPLE

The following is a non-limiting example of the present invention. It is to be understood that said example is not intended to limit the present invention in any way. Equivalents or substitutes are within the scope of the present invention.

In studying the nervous system phenotypes of loss of the transmembrane protein, TMEM184B, which include axon protection as well as dysmorphic nerve terminals, Inventors sought to identify expression changes that could contribute to these phenotypes. RNA sequencing was performed on isolated adult DRGs of 6-month-old Tmem184b global knockout mice and compared sequences to age-matched wild-type mice. 316 genes had significantly downregulated (adjusted $p<0.05$) transcript expression in Tmem184b-mutant ganglia, and 90 genes that had significantly upregulated transcripts (FIG. 1A-1B). Strikingly, the downregulated genes contained a large fraction of markers previously identified in single-cell RNAseq studies as being unique to a population of pruriceptive neurons (called C2 or NP3 in previous studies). The key markers of NP3/C2 neurons are dramatically downregulated, with Il31ra, Nppb, and Sst being among the largest changes seen in the dataset (FIG. 1B). However, other types of neurons also showed decreased expression of their unique markers, including NP2 (identified by Mrgpra3) and NP1 (identified by Mrgprd) (FIG. 1C). Taken together, this data identifies Tmem184b as a major regulator of somatosensory gene expression, particularly in pruriceptive populations.

To predict the functional significance of these expression changes, pathway analysis was performed (see below for details). Downregulated transcripts were enriched in pathways such as G-protein coupled receptor (GPCR) signaling, mitogen-activated protein (MAP) kinase signaling, and synaptic transmission (FIG. 1D). When human phenotype ontology was examined, pruritus was the top and most significantly changed feature ($p<0.003$). These data show that Tmem184b is required for appropriate transcription of signaling pathways critical to normal sensory function.

To test the behavioral consequences of the expression changes observed in Tmem184b-mutant mice, the mutant mice were challenged with agonists that promote itch and pain. The cytokine IL-31, implicated in atopic dermatitis, activates the IL31RA/OSMR heterodimeric receptor on NP3/C2 DRGs, whereas the anti-malarial agent chloroquine (CQ) activates MRGPRA3 on NP2/C4 DRGs. Tmem184b-mutant mice are resistant to scratching evoked by IL-31 injection (FIG. 2A). In addition, mutant mice have a reduced response to chloroquine, although the reduction does not reach statistical significance (FIG. 2B, p=0.07). To examine the effects on other nociceptive populations, mechanical threshold and thermal pain testing were performed. Tmem184b-mutant mice responded normally to these stimuli (FIG. 2C-2E). Taken together, this data shows that Tmem184b is selectively required for behavioral responses to pruriceptive agonists.

To determine whether functional shifts in adult somatosensory neuron populations had occurred, calcium imaging on dissociated adult DRG neurons was performed. A significant reduction in the percentage of neurons that responded to the broad nociceptive receptor agonists, capsaicin (TRPV1 agonist) and allyl isothiocyanate (AITC, a TRPA1 agonist) was observed (FIG. 3A-3B). The percent of neurons responding to two agonists specific for the NP3/C2 population, CYM5442 (an S1PR1 agonist) and LY344862 (an HTR1F agonist) was reduced (FIG. 3D-3E). These results support the genetic labeling data and suggest that cell loss contributes to the pruriceptive phenotypes. Paradoxically, mutant mice showed an increased percentage of neurons responding to both IL-31 and chloroquine (FIGS. 3F and 3G). Because in wild type mice, S1pr1, Htr1f, and Il31ra are all unique markers of NP3/C2 neurons, it was interpreted that these dynamic changes as evidence that gene expression has been at least partially uncoupled with cell fate in Tmem184b-mutant ganglia. To rectify the increase in the percentage of IL31 responsive neurons with the loss of behavioral responses, the amplitude of IL31-induced calcium increases in individual neurons was evaluated. Among neurons classified as responders, IL-31 triggered substantially weaker responses in mutant neurons when compared to wild type (FIG. 3H). The reduction in responses of individual neurons to IL-31 likely contributes to the loss of IL-31-induced pruriception in adults.

Given the results showing reductions in the NP3/C2 population, Inventors sought to evaluate whether Tmem184b contributes solely to early neuronal specification or if it can influence pruriceptive function in adulthood. If Tmem184b's role is primarily developmental, then re-expression in adults should not rescue IL-31 responsiveness. An adeno-associated (AAV9) virus encoding Tmem184b under the control of the neuronal-specific Synapsin promoter was constructed, and either this virus, or control AAV9 expressing only mCherry was injected, into the cervical intrathecal space (FIG. 4A). Histological analysis showed that the virus was able to spread to DRG from C1-C10 (FIG. 4B) and also into some of the central axonal projections of these DRGs into the dorsal horn (FIG. 4C). Virus expression was also seen in the dorsal gray matter (FIG. 4C). In these mice, scratching responses were evaluated to subsequent cervical IL-31 injection. All IL-31-injected mutant mice showed some scratching responses compared to saline controls, suggesting that AAV injection and expression influenced the baseline levels of IL-31 responsiveness (FIG. 4D). Surprisingly, in wild-type mice, overexpression of Tmem184b attenuates scratching to IL-31 injection. However, mutant responsiveness was unable to be altered with adult re-expression of Tmem184b. The failure to rescue in adults is consistent with a primary effect of TMEM184B activity during development of pruriceptive neurons.

The data supports a significant role for Tmem184b in the control of pruriception. Tmem184b-mutant DRGs show reduction of pruriceptor transcripts in the NP3/C2 population. Of note, the IL-31 receptor subunit Il31ra and its co-receptor Osmr, are both strongly reduced in the absence of Tmem184b. IL-31-induced scratching as well as lower response magnitudes in individual neurons in response to IL-31 application. IL-31-mediated itch is central to the development of atopic dermatitis, and thus the expression and function of its receptor is of significant medical interest. The data identifies a novel mechanism promoting the expression of the IL-31 receptor on sensory neurons and ultimately controlling IL-31 induced behaviors.

Using a genetic labeling strategy, it was found that NP3/C2 neuron numbers are reduced in the absence of Tmem184b, though they are not completely eliminated. Using calcium imaging, a reduction of nociceptive neurons generally and skewed numbers and/or sensitivity of remaining pruriceptive populations was found. In addition, at E13, reductions in transcripts encoding critical developmental factors including Neurog1, Neurog2, and Brn3a were seen. These three factors are essential for the establishment and differentiation of neurons within sensory ganglia. Without wishing to limit the present invention to any theory or mechanism it is believed that TMEM184B acts early in sensory development to promote the proper specification of nociceptive and pruriceptive neurons.

It is possible that Tmem184b has an additional role in adult nociceptor maintenance. First, in wild type mice, over-expression of Tmem184b causes reduction in IL-31-induced scratching (FIG. 4D). One possible explanation is that TMEM184B may be promoting apoptosis. In support of this model, a decreased expression of apoptotic pathway components when Tmem184b is absent is seen and restoration of these components upon Tmem184b re-expression in cultured DRGs (data not shown). Future experiments deleting Tmem184b solely in adults would be necessary to clarify roles for TMEM184B in long-term maintenance of pruriceptors.

In summary, the present invention demonstrates that TMEM184B activity critically affects the development of pruriceptive neurons in mouse DRG and that this effect is likely due to its ability to induce components of Wnt signaling during neurogenesis. The data illuminates a new key regulatory step in the processes controlling the establishment of diversity in the somatosensory system.

Animal Models

All animal treatment was approved by the Institutional Animal Care and Use Committee at the University of Arizona. Tmem184b gene-trap mice have been described previously. Mice were bred to Sst-Cre and Rosa-Flox-stop-Flox-tdTomato (also called Ai9) (lines 013044 and 007909, Jackson Laboratory, Bar Harbor, Me.) for histological quantification of the C2 population. Only heterozygous Sst-Cre mice were used for experiments due to the possible disruption of normal somatostatin expression in homozygous Cre mice.

RNA Sequencing

Total RNA was isolated from adult DRG from 6-month old mutant and wild-type mice (4 per genotype, mixed male and female groups) using the RNaqueous Micro kit (Ambion). All DRGs were pooled for each sample to obtain enough RNA for analysis. Following total RNA extraction, samples were ethanol precipitated to increase purity. Library preparation and sequencing was performed at the Washington University Genome Technology Access Center (GTAC). Data were analyzed using Salmon and DeSeq2 (on Inventors' servers or with Galaxy, www.usegalaxy.org). Volcano plots were generated in RStudio; heatmaps of genes for which adjusted P values were less than 0.05 were created using Cluster 3.0 and Java Treeview. To create heatmaps of normalized counts, hierarchical clustering was used in Cluster3.0 to arrange genes by expression similarity. For embryonic DRG analysis, total RNA was isolated using Trizol and library preparation and sequencing was performed by Novogene; identical analysis methods were used. For pathway analysis, Inventors used Panther over-representation analysis (http://www.pantherdb.org/) as well as Enrichr (www.enrichr.com).

Cytokine Injections and Behavior Analysis

Mice were at least 8 weeks old at the time of injection. Littermate controls were used, and videos were captured early in the morning to minimize mice falling asleep during videotaping. Mice were acclimated to behavioral chambers (red Rat Retreats, Bioserv) for one hour, removed from the chamber briefly for injections of either IL-31 (Peprotech, 3 nmol in 10 microliters of PBS for cheek injections or 300 μM for nape injections, depending on experiment), chloroquine (concentration), or 0.9% saline alone, and returned to the chamber, at which time videotaping began. Analysis was done blinded to genotype and injected substance. Scratching bouts were tallied for each 5-minute period up to 30 minutes post-injection.

AAV Injection

Custom AAV9 was built and titered by Vector Biolabs. Viruses were intrathecally injected (10 ul, 2.0×10^6 virus particles/mL) at 8 to 9 weeks of age. Each mouse received intradermal (i.d.) saline injections 3 weeks after AAV delivery, and one week later received i.d. IL-31 injections. One Tmem184b mutant mouse with ~10× average scratching behavior to both saline and IL-31 was treated as an outlier and removed from the analysis.

DRG Immunohistochemistry and Image Analysis

Isolated ganglia were fixed with 4% paraformaldehyde for 1 hour, immersed in 30% sucrose overnight (4° C.), and embedded in OCT cryo-compound (Tissue-Tek® O.C.T.) using isopentane cooled with dry ice. Cryoections (14 μm thickness) were-mounted onto charged microscope slides. Following washes in PBST and 1 hour of blocking in 5% goat serum in PBST, sections were incubated with rabbit NeuN (1:250, Proteintech) overnight at 4° C. Secondary antibody was goat anti-rabbit Alexa Fluor 633 (Thermo Fisher). Sections were mounted in Vectashield (Vector Biolabs) and imaged using a ZEISS Axio Observer Z1 at 20× magnification. Cells with a visible nucleus in the section were counted using ImageJ. For each mouse, 800-1000 from 5-6 mice were quantified.

Neuronal Culture

For adult neurons, ganglia from all spinal levels were pooled in DMEM on ice, followed by digestion with Liberase™ (Roche) and 0.05% Trypsin (Gibco). Neurons were dissociated and spotted in dense cultures on poly-D-lysine (Sigma) and laminin coated chambered coverglass (Nunc) or 100 mm glass coverslips, and grown overnight in Dulbecco's Modified Eagle Medium (Gibco) with 10% fetal bovine serum (Atlas Biologicals) and Penicillin/Streptomycin (Gibco). For embryonic DRG culture, ganglia were dissociated with Trypsin, triturated with a P1000 pipette tip, and plated in 5-10 □l spots in a 24-well dish previously coated with poly-D-lysine and laminin. Media contained B27 (Gibco), 5-fluoro-deoxy-uridine (FDU) and nerve growth factor (NGF) (Invitrogen). Half of the media volume was exchanged every 5 days until cells were collected for analysis.

Calcium Imaging

Adult DRG neurons were imaged either with Fluo-4 dye on a Zeiss Observer Z1 microscope, or with Fura-2 dye on an Olympus BXW microscope under a 10× immersion objective lens with a filter wheel and Hamamatsu camera, each with a frame rate of one image/3 sec. Fluorescence videos were acquired via Zeiss or HCImage Software, processed and analyzed using MATLAB, and RStudio for quantification of fluorescent responses. Inventors used a custom-written R script to identify neurons via responses to high potassium in each experiment. Responses to individual agonists were determined manually for all neurons. Each agonist was evaluated using cultures from at least 3 mice, and most agonist-genotype combinations have >1000 neurons analyzed (minimum 659, maximum 2333). Coverslips with extensive motion or other artifacts were excluded from analysis.

Statistics

All statistical analysis was performed in Graphpad Prism. For all figures, asterisks indicate $p<0.05$ (*), $p<0.01$ (), or $p<0.001$ (*).

Embodiments of the present invention can be freely combined with each other if they are not mutually exclusive.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A method of treating sensation of itch or pruritus in a subject in need thereof, said method comprising administering a compound comprising a recombinant TMEM184B or a nucleic acid vector encoding thereof to the subject to cause a reduction in the sensation of itch or pruritus.

2. The method of claim 1, wherein the compound is integrated into a pharmaceutically acceptable carrier.

3. The method of claim 2, wherein the pharmaceutically acceptable carrier is a lipid-based carrier, wherein the lipid-based carrier is a liposome.

4. The method of claim 1, wherein the sensation of itch is IL-31-induced itch.

5. The method of claim 1, wherein the method further treats dermatitis.

6. A method of treating dermatitis in a subject in need thereof, said method comprising administering a compound comprising a recombinant TMEM184B or a nucleic acid vector encoding thereof to the subject to cause a reduction in dermatitis.

7. The method of claim 6, wherein the compound is integrated into a pharmaceutically acceptable carrier.

8. The method of claim 7, wherein the pharmaceutically acceptable carrier is a lipid-based carrier, wherein the lipid-based carrier is a liposome.

\* \* \* \* \*